United States Patent
Wallace

(10) Patent No.: US 10,935,424 B2
(45) Date of Patent: Mar. 2, 2021

(54) POLARIZING SENSING FOR SPECTROMETERS

(71) Applicant: California Institute of Technology, Pasadena, CA (US)

(72) Inventor: James K. Wallace, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/563,616

(22) Filed: Sep. 6, 2019

(65) Prior Publication Data

US 2020/0080892 A1 Mar. 12, 2020

Related U.S. Application Data

(60) Provisional application No. 62/727,960, filed on Sep. 6, 2018.

(51) Int. Cl.
| | |
|---|---|
| *G01J 3/447* | (2006.01) |
| *G01J 3/02* | (2006.01) |
| *G01J 3/50* | (2006.01) |
| *G01J 3/28* | (2006.01) |
| G02B 23/02 | (2006.01) |

(52) U.S. Cl.
CPC .............. *G01J 3/0224* (2013.01); *G01J 3/28* (2013.01); *G01J 3/502* (2013.01); *G02B 23/02* (2013.01)

(58) Field of Classification Search
CPC ...... G01J 3/02; G01J 3/447; G01J 3/18; G01J 3/42; G01N 21/211
USPC ........................................................ 356/327
See application file for complete search history.

(56) References Cited

U.S. PATENT DOCUMENTS

| | | | | |
|---|---|---|---|---|
| 2010/0149533 A1* | 6/2010 | Fest | .................... | G02B 27/286 |
| | | | | 356/367 |
| 2014/0285878 A1* | 9/2014 | Escuti | ................. | G02F 1/13363 |
| | | | | 359/352 |

OTHER PUBLICATIONS

Bovensmann et al., "Sciamachy: Mission Objectives and Measurement Modes", Journal of the Atmospheric Sciences. Jan. 15, 1999, vol. 56, No. 2, pp. 127-150, doi: 10.1175/1520-0469.

Buchwitz et al., "Carbon Monitoring Satellite (CarbonSat): assessment of atmospheric CO2 and CH4 retrieval errors by error parameterization", Atmos. Meas. Tech., Dec. 10, 2013, vol. 6, pp. 3477-3500, doi: 10.5194/amt-6-3477-2013.

Butz et al., "Tropomi aboard Sentinel-5 Precursor: Prospective performance of CH4 retrievals for aerosol and cirrus loaded atmospheres", Remote Sensing of Environment, May 15, 2012, vol. 120, pp. 267-276, doi: 10.1016/j.rse.2011.05.030.

Crisp et al., "The Orbiting Carbon Observatory (OCO) mission", Advances in Space Research, 2004, vol. 34, No. 4, pp. 700-709, doi: 10.1016/j.asr.2003.08.062.

Frankenberg et al., "Iterative maximum a posteriori (IMAP)-DOAS for retrieval of strongly absorbing trace gases: Model studies for CH4 and CO2 retrieval from near infrared spectra of SCIAMACHY onboard ENVISAT", Atmospheric Chemistry and Physics, Jan. 12, 2005, vol. 5, pp. 9-22, doi: 10.5194/acp-5-9-2005.

(Continued)

*Primary Examiner* — Md M Rahman
(74) *Attorney, Agent, or Firm* — KPPB LLP

(57) ABSTRACT

A spectral measurement device capable of achieving a high level of diffraction efficiency by reducing the polarization sensitivity of the device. Many such embodiments are capable of achieving high diffraction efficiency by fixing the polarization of the incoming light to a fixed polarized state internal to the device, thereby allowing for the full spectrum of light to be captured and measured by the device.

20 Claims, 8 Drawing Sheets

(56) References Cited

OTHER PUBLICATIONS

Frankenberg et al., "Retrieval of CO from SCIAMACHY onboard ENVISAT: detection of strongly polluted areas and seasonal patterns in global CO abundances", Atmospheric Chemistry and Physics, Jun. 27, 2005, vol. 5, pp. 1639-1644, doi: 10.5194/acp-5-1639-2005.

Gully-Santiago et al., "High performance Si Immersion Gratings Patterned with Electron Beam Lithography", Proc. SPIE, Jul. 28, 2014, vol. 9151, pp. 91515K-1-91515K-13, doi: 10.1117/12.2056912.

Jaffe et al., "GMTNIRS: progress toward the Gian Magellan Telescope Near-Infrared Spectrograph", Proc. SPIE, vol. 9908, pp. 900821-1-900821-9 2016, doi: 10.1117/12.2232994.

Marsh et al., "Silicon Grisms and Immersion Gratings Produced by Anisotropic Etching: Testing and Analysis", Proc. SPIE, Mar. 5, 2003, vol. 4850, pp. 797-804 doi: 10.1117/12.461759.

Miller et al., "Capturing Complete Spatial Context in Satellite Observations of Greenhouse Gases", Proc. SPIE, Sep. 19, 2016, vol. 9976, pp. 997609-1-997609-13997609, doi: 10.1117/12.2238766.

Park et al., "Design and early performance of IGRINS (immersion grating infrared spectrometer", Proc. SPIE, Jul. 8, 2014, vol. 9147, pp. 9147D1-9147D12, doi: 10.1117/12.2056431.

Rayner et al., "iSHELL: a 1-5 micron cross-dispersed R=70,000 immersion grating spectrograph for IRTF", Proc. SPIE, Sep. 24, 2012, vol. 8846, pp. 8846C1-8846C12, doi: 10.1117/12.925511.

Schimel et al., "Observing the Carbon-Climate System", Apr. 7, 2016, arXiv:1604.02106, 30 pgs.

Jaffe, "Development of Immersion Gratings to Enable a Compact Architecture for High Spectral and Spatial Resolution Imaging", NASA Grant NNX12AC31G, Final Report, 2015.

Veefking et al., "Tropomi on the ESA Sentinel-5 Precursor: A GMES mission for global observations of the atmospheric composition for climate, air quality and ozone layer applications", Remote Sensing of Environment, May 15, 2012, vol. 120, pp. 70-83, doi: 10.1016/j.rse.2011.09.027.

* cited by examiner

POLARIZING SENSING FOR SPECTROMETERS

CROSS-REFERENCED APPLICATIONS

This application claims priority to U.S. Provisional Patent Application No. 62/727,960 filed on 6 Sep. 2018. The enclosure of which is included herein by reference in its entirety.

STATEMENT OF FEDERALLY SPONSORED RESEARCH

This invention was made with government support under Grant No. 80NM0018D004 awarded by NASA (JPL). The government has certain rights in the invention.

FIELD OF THE INVENTION

The present invention generally relates to spectrometers and the polarization of such to enhance the detection capabilities of spectrometers.

BACKGROUND OF THE INVENTION

Spectrometers are instruments that utilize the properties and function of light to separate out and measure a variety of spectral components and physical phenomenon. A spectrometer is capable of measuring individual bands of color separated from white light and can be used in a variety of applications. For example, mass spectrometers can measure the spectrum of masses of atoms or molecules present in a substance. Additionally, spectrometers have the ability to measure and determine the chemical composition which has continued drive their use in many areas of science such as physics, astronomy, and chemistry. Spectrometers, such as optical spectrometers, typically involve multiple components such as telescopes, optical lenses, gratings, and detectors. They can use a grating or prism to spread light from a distant object over a certain spectrum and direct the spectrum of light to a detector for measurement and evaluation. The spreading of the light can allow the detection of elements by their various "spectral fingerprints." This can allow users to determine the exact concentration of such elements in a measured substance like the atmosphere.

The increased use of the variety of spectrometers allows researchers and scientists to implement spectrometers in larger instruments or devices that can be used for a variety of purposes. For example, spectrometers can be used in medical devices and satellites. Additionally, with the increase of carbon based emissions leading to such issues like climate change, many researchers may utilize spectrometers to determine the level of such emissions present in a given area. The continuously changing environment helps to fuel the continued use and development of spectrometers.

BRIEF SUMMARY OF THE INVENTION

Many embodiments are directed to spectral imaging systems that have a higher diffraction efficiency. Many embodiments include an optical telescope component with a prism configured to receive overlapping polarized light states and diverge the overlapping light states into a first polarized light state and a second polarized light state orthogonal to the first polarized light state. Additionally, the component has an optical lens optically coupled to the prism and configured to direct the first and second polarizing light states to a focal plane. The focal plane further has a first half-wave plate and a second half-wave plate corresponding to the first and second polarized light states where the half-wave plates are configured to change the polarization of the second polarization light state to match the polarization of the first polarization light state. This subsequently forms a matching polarizing light state internal to an instrument. The first polarizing light state and matching polarizing light state can pass through a slit within the focal plane having two components corresponding to each of the light states. Additionally, the optical telescope component has a linear polarizer optically coupled to the focal plane and configured to direct the polarizing light states to a detector.

In other embodiments, the prism is a Wollaston prism.

In still other embodiments, the first and second half-wave plates are true zero-order half-wave plates.

In yet other embodiments, the second half-wave plate is oriented to 45 degrees.

In still yet other embodiments, the first half-wave plate is oriented to 0 degrees.

In other embodiments, the optical telescope component has a rotating half-wave plate.

In still other embodiments, the optical telescope component has a rotating quarter-wave plate.

Other embodiments include a spectrometer with an optical telescope component that includes a prism configured to receive overlapping polarized light states and diverge the overlapping light states into a first polarized light state and a second polarized light state orthogonal to the first polarized light state. Additionally, the telescope component has an optical lens optically coupled to the prism and configured to direct the first and second polarizing light states to a focal plane. The focal plane further has a first half-wave plate and a second half-wave plate corresponding to the first and second polarized light states where the half-wave plates are configured to change the polarization of the second polarization light state to match the polarization of the first polarization light state. This subsequently forms a matching polarizing light state internal to an instrument. The first polarizing light state and matching polarizing light state can pass through a slit within the focal plane having two components corresponding to each of the light states. Additionally, the optical telescope component has a linear polarizer optically coupled to the focal plane. The spectrometer also has a plurality of optical prisms optically coupled to the telescope component and configured to receive internally polarized light from the telescope component and direct it to and from a grating element. The grating element is configured to separate the incoming polarized light into a desired spectrum and redirect the desired spectrum to a detector.

In other embodiments, the grating element is a silicon grating element.

In still other embodiments, the grating element is manufactured in a first diffraction order.

In yet other embodiments, the grating element is manufactured in a diffraction order selected from a group consisting of 1, 2, 3, and 4.

In still yet other embodiments, the prism is a Wollaston prism.

In other embodiments, the first and second half-wave plates are true zero-order half-wave plates.

In still other embodiments, the second half-wave plate is oriented to 45 degrees.

In yet other embodiments, the first half-wave plate is oriented to 0 degrees.

In still yet other embodiments, the spectrometer has a rotating half-wave plate.

In other embodiments, the spectrometer has a rotating quarter-wave plate.

In still other embodiments, the optical prisms are Littrow optics.

In yet other embodiments, the spectrometer has a compensator prism optically coupled to the optical prisms and the grating element.

Other embodiments include a spectral measurement device that has a first and a second spectrometer where each of the spectrometers has an optical telescope component that includes a prism configured to receive overlapping polarized light states and diverge the overlapping light states into a first polarized light state and a second polarized light state orthogonal to the first polarized light state. Additionally, the telescope component has an optical lens optically coupled to the prism and configured to direct the first and second polarizing light states to a focal plane. The focal plane further has a first half-wave plate and a second half-wave plate corresponding to the first and second polarized light states where the half-wave plates are configured to change the polarization of the second polarization light state to match the polarization of the first polarization light state. This subsequently forms a matching polarizing light state internal to an instrument. The first polarizing light state and matching polarizing light state can pass through a slit within the focal plane having two components corresponding to each of the light states. Additionally, the optical telescope component has a linear polarizer optically coupled to the focal plane. The spectrometer also has a plurality of optical prisms optically coupled to the telescope component and configured to receive internally polarized light from the telescope component and direct it to and from a grating element. The grating element is configured to separate the incoming polarized light into a desired spectrum and redirect the desired spectrum to a detector.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Turning now to the drawings many embodiments include components for use in spectrometer which are is designed to measure orthogonal polarization states and subsequently match the incoming polarization states to a fixed polarization state internal to the spectrometer. Such embodiments allow for the full use of all incoming light in the measurement and evaluation of spectral imaging of desired elements.

Spectrometers today consist of a variety of components that allow them to perform the desired function or measurements. For example, many spectrometers may include optical lenses, gratings, prisms, and detectors etc. that form parts of the spectrometer for detecting spectral fingerprints of the desired elements. Each of these components have certain polarization sensitivities that can affect how the spectrometer functions or the signal to noise ratio of the spectrometer. For example, the grating elements can have a certain polarization sensitivities that can affect the polarization state of the spectrometer as a whole. Additionally, atmospheric constituents such as aerosols can act as polarizing elements. Accordingly, such polarizations can cause degeneracy between the polarization effects of the atmosphere and the polarization state of the spectrometer, resulting in lower performance of the spectrometer. The traditional solution to the degeneracy has been to add a linear polarizer to the spectrometer components in order to firmly establish the polarization state of the spectrometer such that it can be accounted for in the detection process. However, linear polarizers can be extremely sensitive to placement and the incorrect installation can negatively affect the overall efficiency and polarization sensitivity of the spectrometer. Furthermore, the use of linear polarizers can be costly to the amount of light input for the spectrometer. Many such linear polarizers can cut the amount of light input into the spectrometer by as much as half, thereby reducing the detection signal to noise ratio. Accordingly, traditional spectrometers can have great limitations in their ability to fully capture the desired spectrums of light or spectral fingerprints.

Figure 1A:
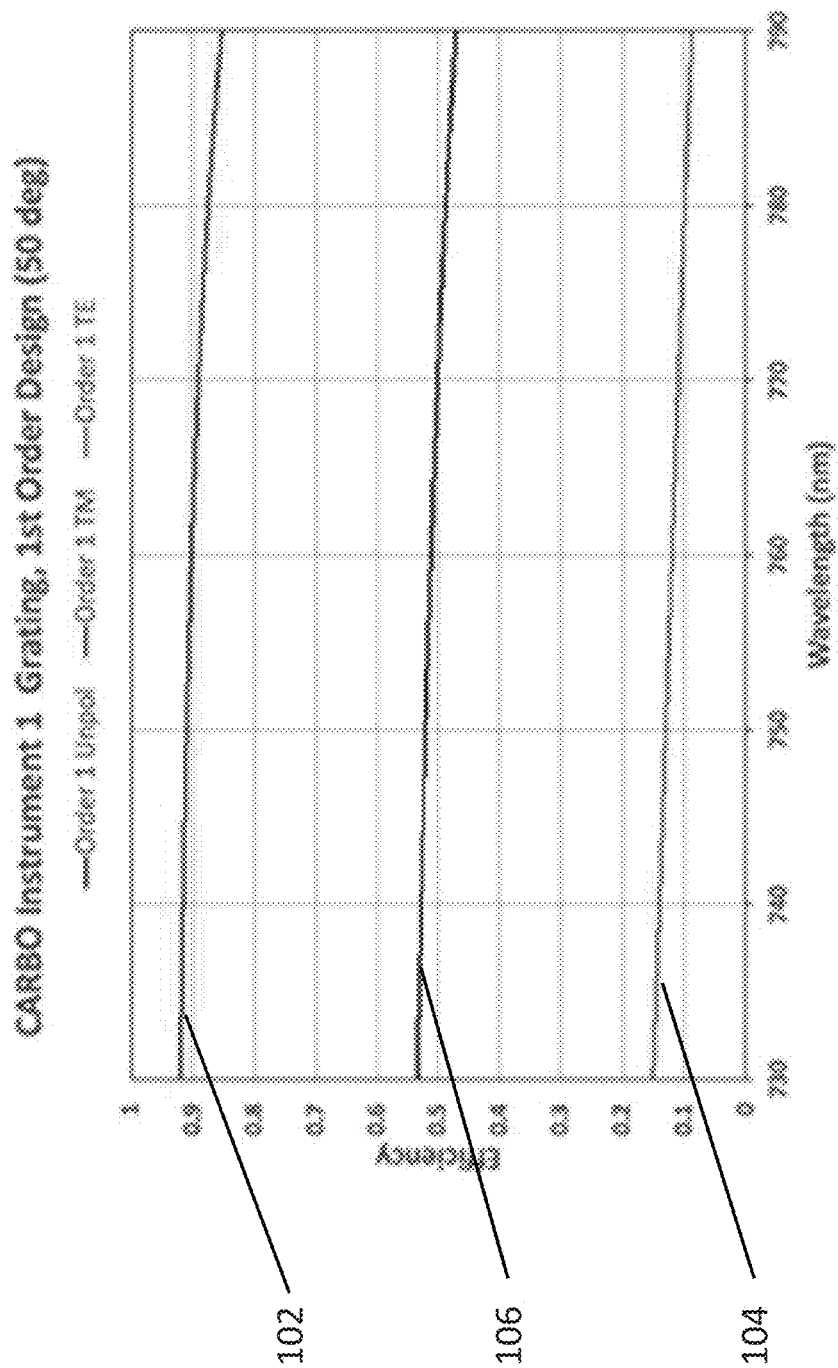
FIGS. 1A and 1B are a graphical illustration of a grating efficiency in accordance with embodiments.
Figure 1B:
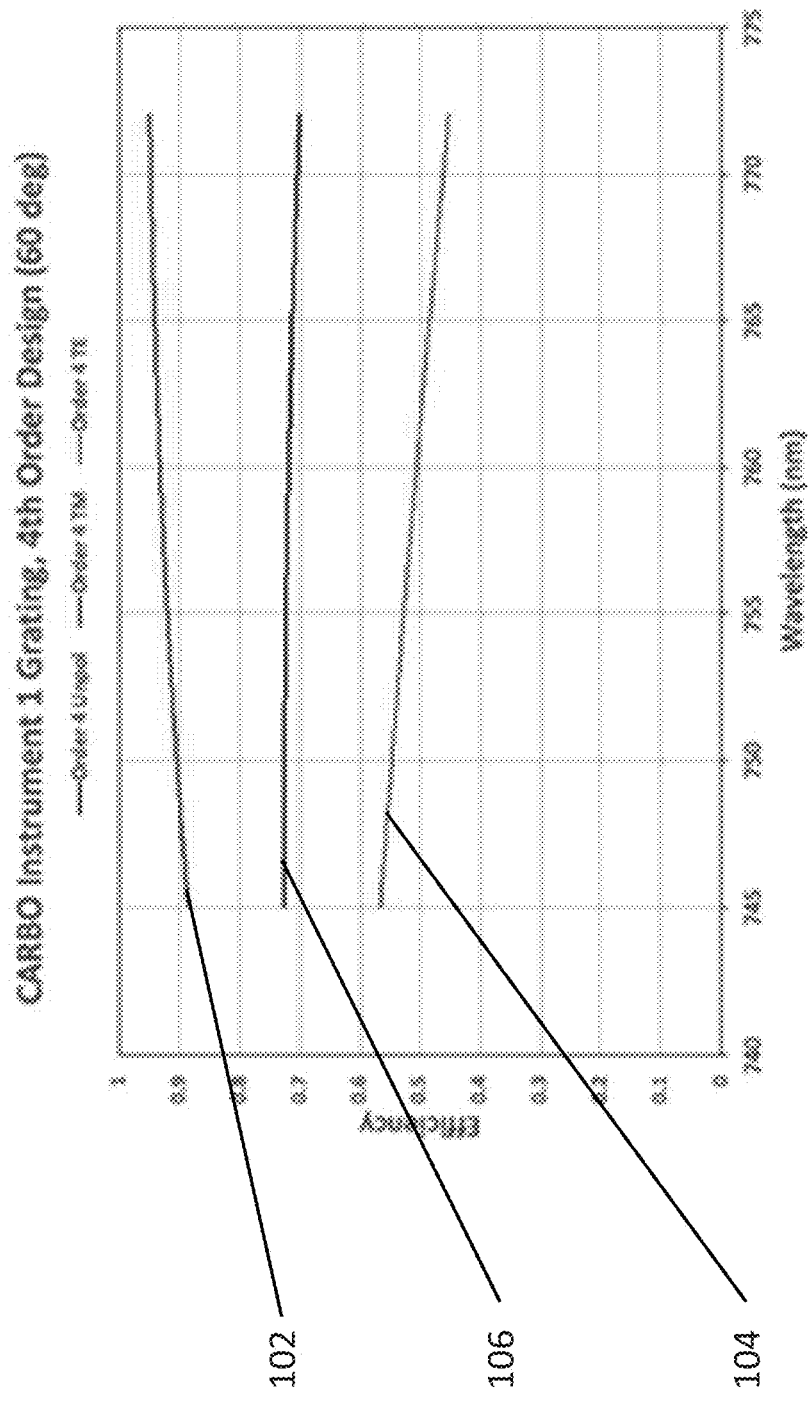

In accordance with some embodiments, the polarization sensitivity of the spectrometer can be improved by the alteration of some components or the introduction of alternative custom components. For example, some embodiments may implement the use of an immersion grating specifically designed to improve the overall polarization sensitivity of the spectrometer. All gratings, both air and immersed, respond to the two orthogonal polarization states in different ways. The difference in polarization state is most pronounced when the grating element is designed to be on the order of wavelength of light. For example, gratings can work within orders of wavelengths such that the grating efficiency can be improved or altered to help improve polarization sensitivity of the spectrometer. FIGS. 1A and 1B illustrate the ability to improve the grating efficiency by altering the grating period with respect to the immersion wavelength. The grating period refers to the spacing between grooves in the grating element. Accordingly, the spacing and cross section of the period can affect the efficiency of the grating.

FIG. 1A illustrates a grating efficiency where the grating period is on the lower or first diffraction order such that the grating period is smaller than the immersion wavelength. Accordingly, it can be seen that on the first diffraction order, the efficiency of one polarization state 102 is greater than the other orthogonal to the first 104. In order to improve the grating efficiency and thus reduce the polarization sensitivity, the gating period can be increased to a higher order such as the $4^{th}$ order as shown in FIG. 1B. The alteration of the grating period can tend to improve the average efficiency of the grating 106 by raising the efficiency of one polarization state 104 and reducing the other 102. It can be seen that relative distance between the polarization states is thus decreased such that the polarization sensitivity of the grating is reduced and likewise the sensitivity of the spectrometer is decreased. However, such improvements to the grating can present various challenges. For example, in order to change the order of the immersion grating, the manufacturing process can be quite complicated. This is because it requires precision machining of silicon crystalline structures that require tight tolerances in order to produce the specific grating efficiency desired.

Figure 2B:
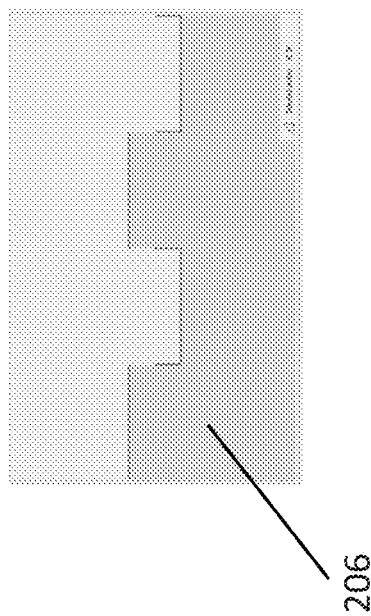
FIGS. 2A and 2B illustrate cross sectional views of a grating element in accordance with embodiments.
Figure 2A:
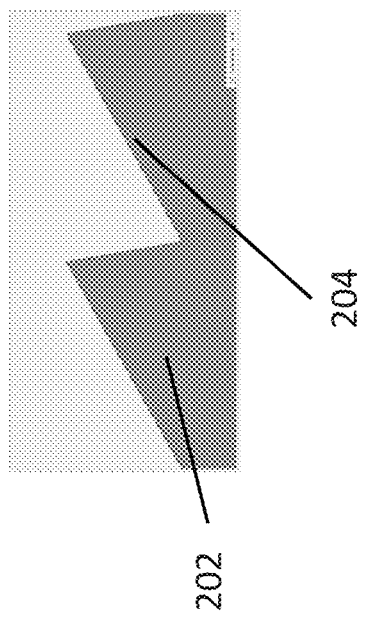

For example, FIGS. 2A and 2B illustrate various grating elements in accordance with some embodiments. FIG. 2A illustrates, a customized immersion grating 202 that requires a customized blaze angle 204 to increase the diffraction efficiency. Such customized angles, as mentioned above can make such immersion gratings difficult and expensive to fabricate due to the high tolerances. However, simpler grating designs like that illustrated in FIG. 2B can be used in a number of embodiments. Simple gratings 206 can be easier and less expensive to manufacture, but as discussed above present various issues with polarization sensitivity.

Figure 3:
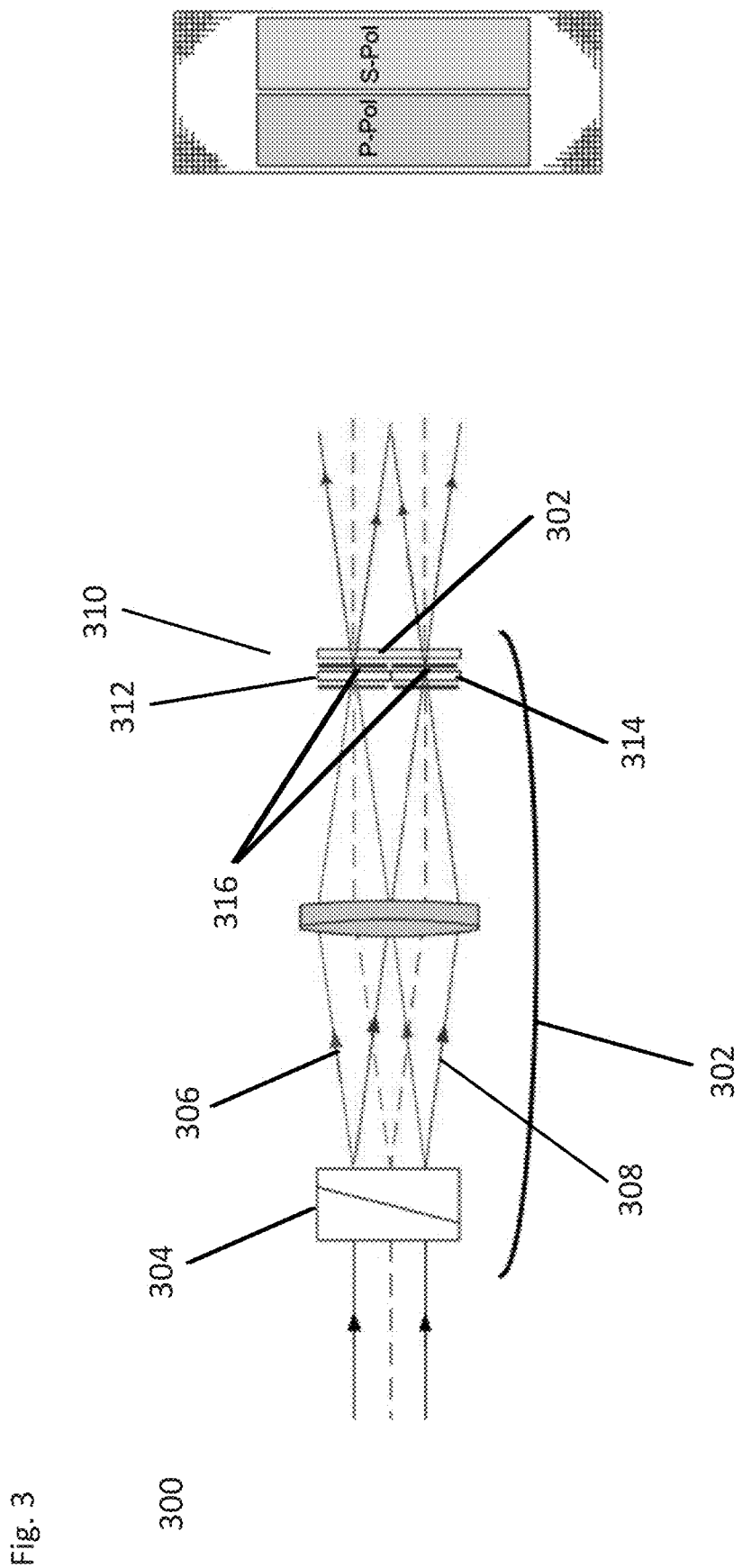
FIG. 3 illustrates a telescopic component of a spectrometer in accordance with embodiments.

Due to the difficulty and increased cost to manufacture such customized immersion gratings illustrated by FIG. 2A, many embodiments aim to improve the overall efficiency and polarization sensitivity of the spectrometer through more simplified methods. Accordingly, many embodiments are directed to the ability to detect or sense both polarization states simultaneously by incorporating one or more polarization components. For example, FIG. 3 illustrates an embodiment of a portion of a spectrometer 300 that makes up a telescopic input unit 302. The telescopic unit 302, in accordance with many embodiments adapts that use of a Wollaston prism 204. The Wollaston prism 304 acts to separate the different polarization states S 306 and P 308 into divergent angular paths with one state being angled up and the orthogonal angle angled down. Accordingly both states can then be measured simultaneously within the telescopic unit 302. Here two images for each of the polarization states (306 and 308) are spatially separated within the telescopic unit 302. From there an additional customization component can be added in the focal plane 310.

In the focal plane 310 the polarization image states can further be adjusted to improve the efficiency and polarization sensitivity. In many embodiments, this can be done by using a true zero-order half-wave plate 312, oriented at 45 degrees to rotate the polarization state to into the other orthogonal polarization state. The other half of the focal plane 310 uses a second true zero-order half-wave plate 314, oriented at 0 degrees. The 0 degree orientation has no effect on the polarization state, but matches the path length of the first side of the image plane. The light then passes through the slit 316 and have been spatially encoded within the system in accordance with their initial polarization state but now have identical polarization states internal to the spectrometer. Accordingly, a linear polarizer can then be aligned to the single polarization state of both beams thereby taking full advantage of the all the light entering a spectrometer.

In accordance with many embodiments, this polarization state internal to the spectrometer, can then be aligned to a grating component, thus giving maximum diffraction efficiency. Referring back to FIG. 1A, the polarization state with a lower efficiency 104 can be internally altered to match the polarization state of that of a higher efficiency 102. Essentially, both polarization states 102 and 104 would be identical and maximized within the spectrometer. Many embodiments can thus utilize a lower order grating component or a simplified grating component to maximize grating efficiency and reduce or eliminate polarization sensitivity of the spectrometer. Likewise, the simplified grating element as illustrate in FIG. 2B (206) can be more easily produced with lower fabrication tolerances and less risk of error and cost in manufacturing.

In addition to the ability to use simplified grating components, sensing both polarizing states simultaneously allows embodiments to use all of the available light to make measurements of the desired elements or spectral fingerprints. Additionally, simultaneous polarization sensing allows for the extraction of additional science measurements that would otherwise be unavailable. For example, many embodiments improve the functionality of the spectrometers in a number of ways such as;
   a) Improve the modeling degrees of freedom for all species;
   b) Enhance the sensitivity of the surface bi-direction reflectance distribution function, including polarization effects;
   c) Improve the sensitivity to aerosol composition (providing better constraints on scattering parameters) and better discrimination of atmospheric and surface scattering; and
   d) Enabling the superior discrimination of the vertical distribution of CO2, CH4, CO and aerosol profiles.

Figure 4:
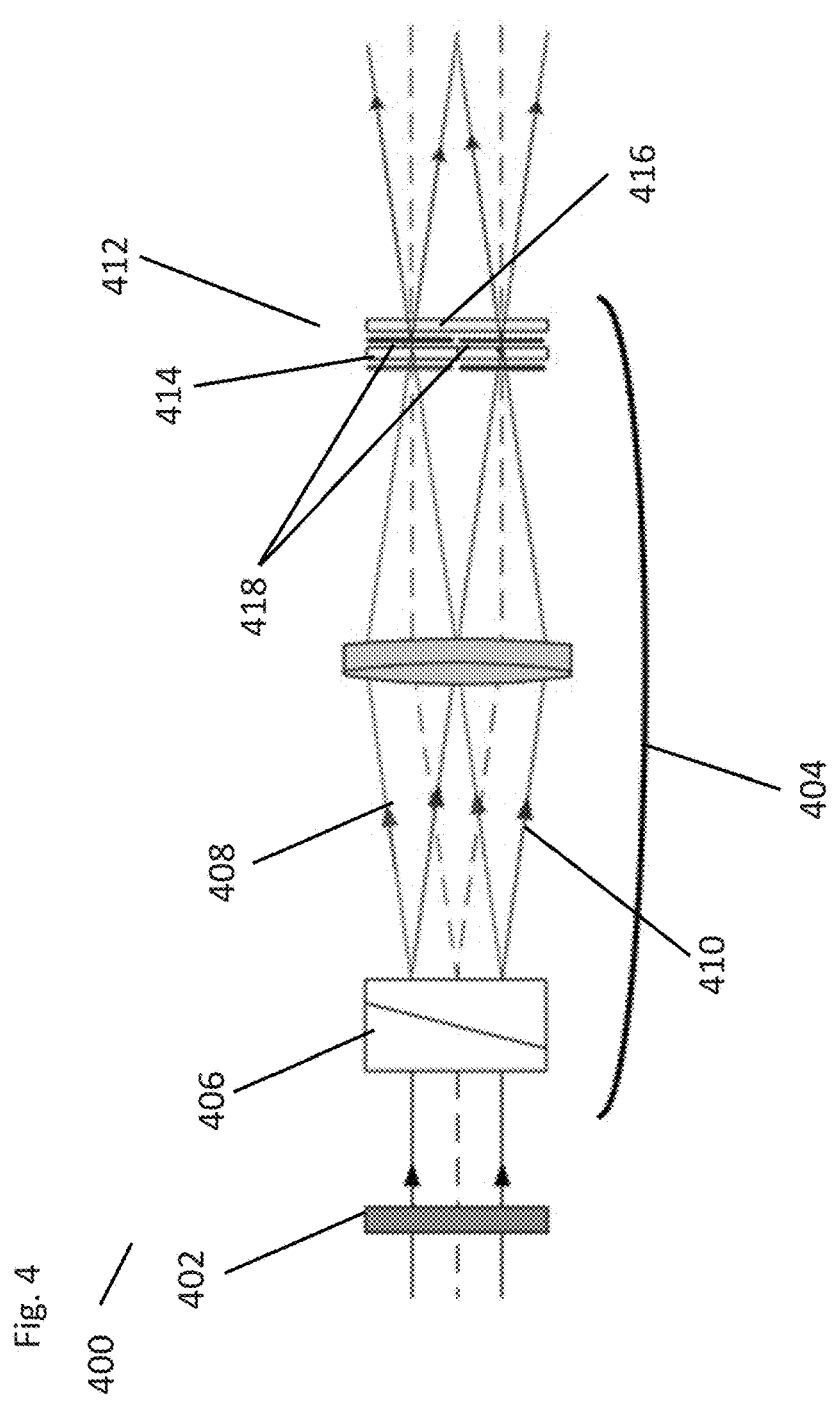
FIG. 4 illustrates a telescopic component of a spectrometer in accordance with embodiments.

In accordance with many embodiments, other components may be added to the spectrometer to help improve the efficiency as well as reduce the polarization sensitivity of the spectrometer. For example, FIG. 4 illustrates an embodiment of telescopic portion 400 of a spectrometer with a rotating half-wave or quarter-wave plate 402. The half-wave plate or quarter-wave plate 402 may be incorporated within the telescopic component 404 prior to the Wollaston prism 406. Similar to the embodiment illustrated in FIG. 3, the telescope 404 is capable of improving the diffraction efficiency by sensing both polarization states 408 and 410 and diverging them through the Wollaston prism 406. Likewise the orthogonal polarization state 408 can be altered to have the same polarization state of the P polarization state 410 internally within the spectrometer. Accordingly, the focal plane 412 can be used in conjunction with a true zero-order half-wave plate 414, oriented at 45 degrees to rotate the polarization state to into the other orthogonal polarization state. The other half of the focal plane 412 uses a second true zero-order half-wave plate 416, oriented at 0 degrees. Thereby resulting in two polarization images having similar polarizations internal to the spectrometer.

The addition of a half-wave plate or quarter-wave plate 402, while simplistic in nature can add great improvement to the overall capabilities of embodiments of a spectrometer. For example, the addition of a half-wave plate or quarter-wave plate 402, in accordance with many embodiments, can extend the ability of the spectrometer to measure the full stokes parameters of the elements to be measured. To enable the measurement of the full Stokes parameters can allow users of the spectrometer to fully understand the polarization of the desired elements. Accordingly, such improvements allow users to fully measure all material characteristics of the desired element or elements such as carbon based emissions. Such improvements can allow for increased ability to generate new methods of prevention.

Figure 5:
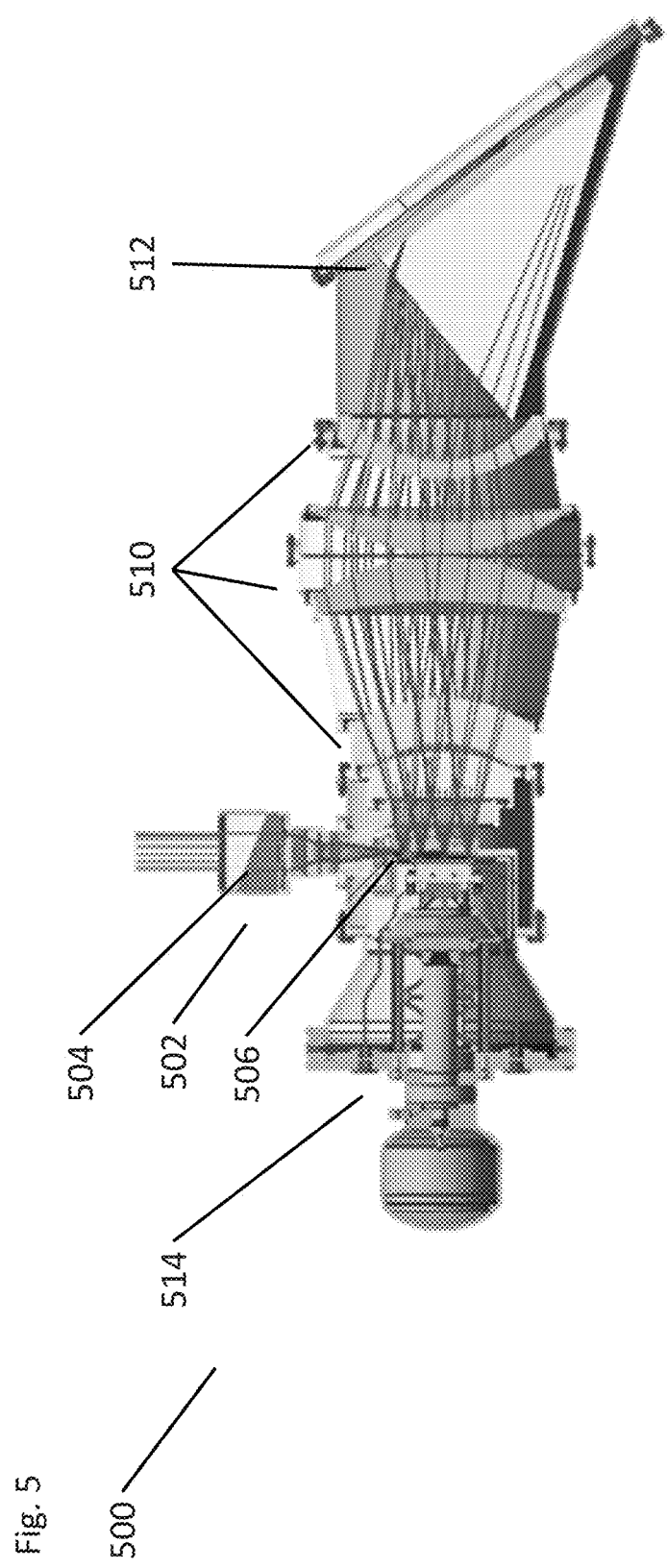
FIG. 5 illustrates a spectrometer in accordance with embodiments.

In accordance with many embodiments, improvements to the telescopic component of a spectrometer can be implemented in a number of devices. For example, the telescopic unit illustrated in FIGS. 3 and 4 may be implanted into a spectrometer with additional elements for measuring a desired spectral fingerprint or material. FIG. 5 illustrate an embodiment of a spectrometer 500 with a telescopic unit 502 composed of a Wollaston prism 504 and a slit 506 similar to those illustrated in FIGS. 3 and 4. Accordingly, the telescopic unit 502 functions according to many embodiments in separating the polarization states and internally converting the orthogonal state such that the polarization internal to the instrument is maximized for efficiency. The incoming light 508 may pass through Littrow Optics 510 and exposed to an immersion grating 512, in accordance with some embodiments. Subsequently, the immersion grating 512 can reflect the light back through the Littrow optics 510 to a detector or camera 514. In accordance with many embodiments, components of the telescopic unit (502, 504, and 506) may be round in nature and fabricated in any number of ways that are suitable for the embodiments illustrated.

Figure 6:
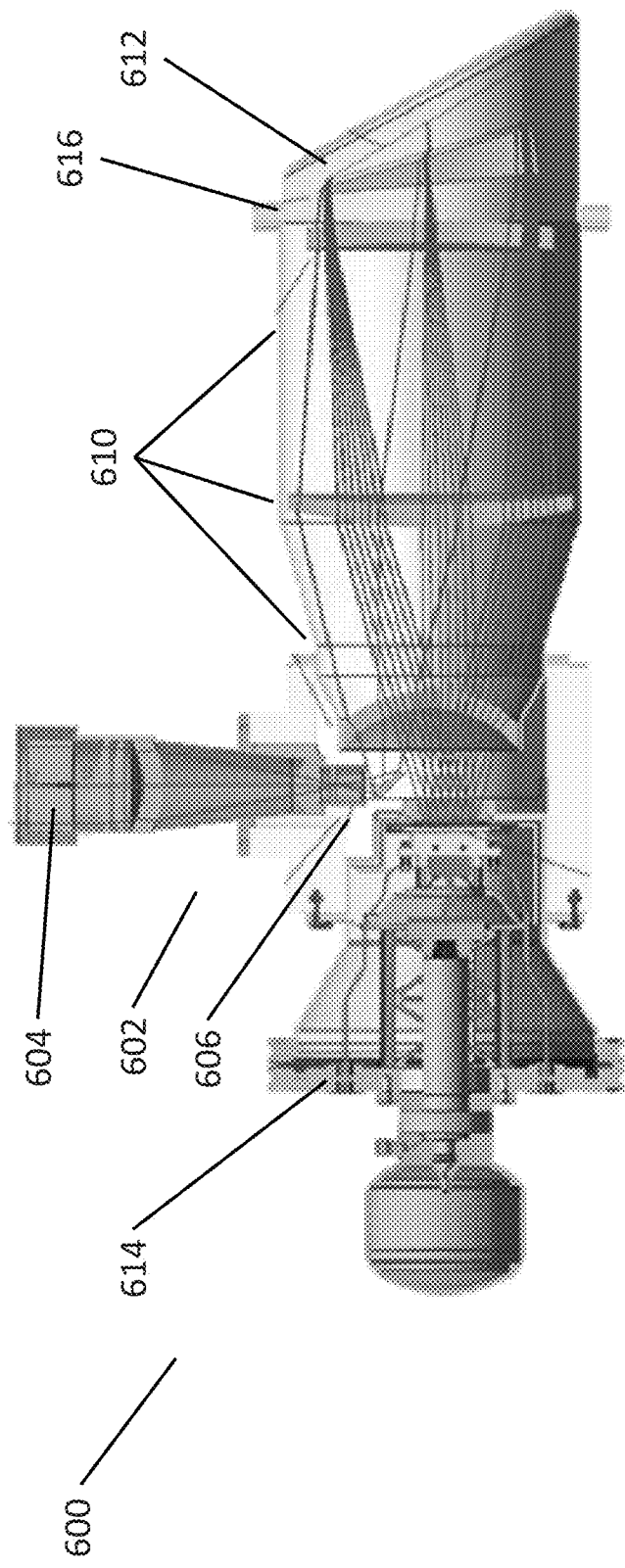
FIG. 6 illustrates a spectrometer in accordance with embodiments.

Similar to the embodiment illustrated in FIG. 5, other embodiments may incorporate a compensating prism 616 as illustrated in FIG. 6. The spectrometer 600 functions in a similar way as the embodiment illustrated in FIG. 5, however the immersion grating 612 is separated into two distinct elements being the immersion grating 612 and the compensating prism 616. The separation of the two elements (612 and 616), in accordance with some embodiments, can allow for the fabrication of more complex immersion gratings 612.

In accordance with many embodiments, the various components of embodiments of spectrometers can be fabricated as individual components or assemblies. For example, in some embodiments the immersion gratings can be fabricated in any number of suitable methods based on the simplicity or complexity of the design. Likewise, many embodiments may use a silicon based immersion grating.

Figure 7:
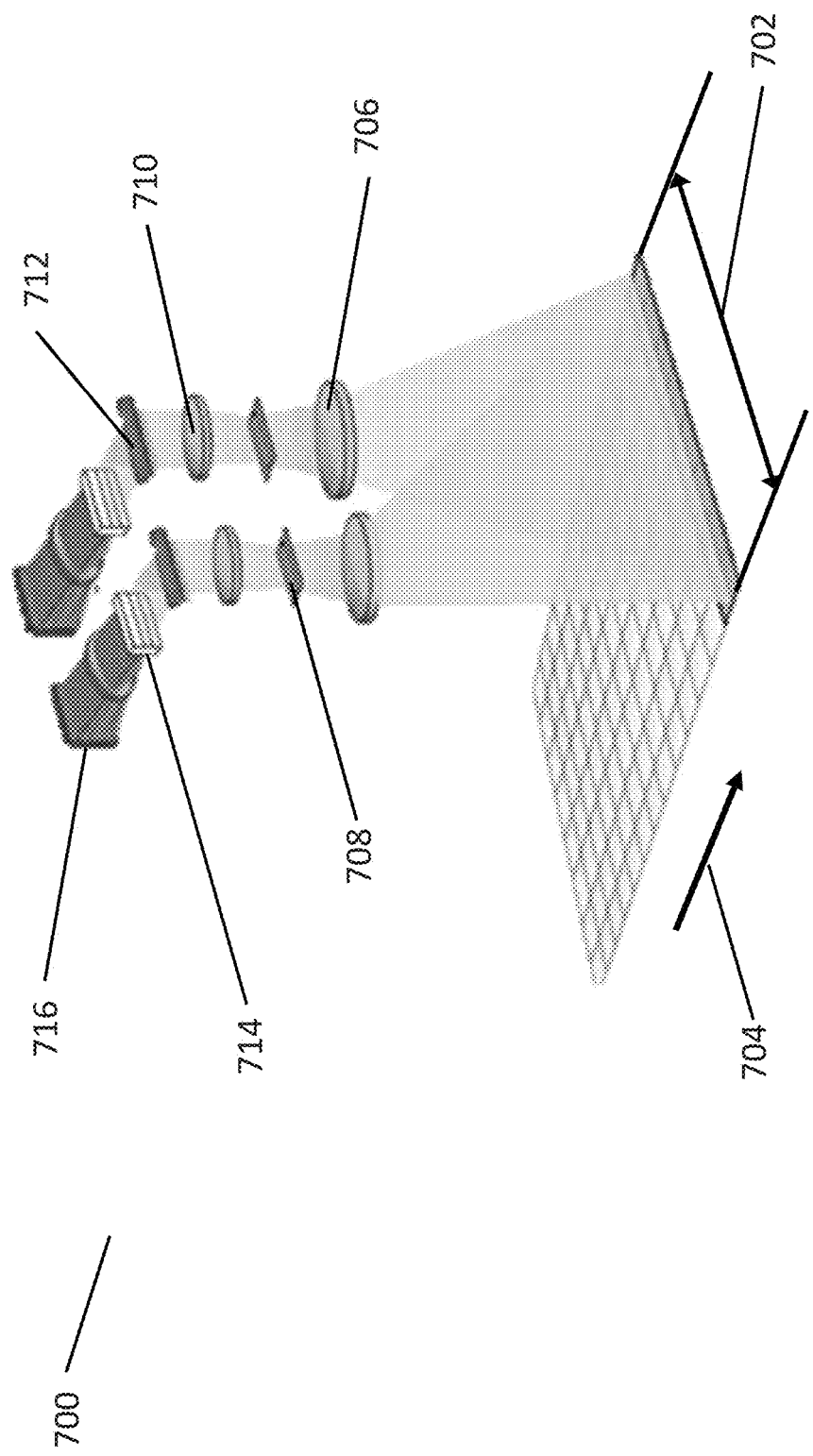
FIG. 7 illustrates multiple spectrometers in a system for measuring in accordance with embodiments.

Spectrometers, in accordance with many embodiments, can be used individually or in connection with other spectrometers for the detection of multiple elements. For example, embodiments of spectrometers can be tuned to the desired frequency of a specific element to be measured and then used in conjunction with one or more other spectrometers to measure the presence and properties of multiple elements. For example, FIG. 7 illustrates an embodiment of two spectrometers 700 configured within a satellite (not shown) and designed to measure a swath 702 of atmosphere along a direction of travel 704 of the satellite. In accordance with many embodiments, each of the spectrometers 700 are configured to intake light from the atmosphere by way of a telescopic component 706 in accordance with embodiments illustrated herein. The light, once repolarized internally in the spectrometers 700 can then pass through a slit 708, collimator 710, a mirror 712, and a grating 714 and eventually to the detector 716. As can be illustrated in FIG. 7, embodiments of the spectrometers 700 are each capable of measuring a desired swath 702 of the atmosphere. As such, the incorporation of more than one spectrometer can allow for more than one desired element to be measured and evaluated at any given time across the path of the satellite 704. The implementation of such embodiments can allow for a greater understanding of the effects of carbon based emissions and other elements found in the atmosphere. While some embodiments described herein are described with respect to carbon based emissions, it should be understood that the embodiments may be used for the detection of any number of elements that may be desired by the user.

Doctrine of Equivalents

As can be inferred from the above discussion, the above-mentioned concepts can be implemented in a variety of arrangements in accordance with embodiments of the invention. Specifically, many embodiments may incorporate the use of one or more customized polarization components that improve the overall diffraction efficiency of a spectrometer by internally fixing the polarization of images within the spectrometer. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An optical telescope component comprising:
   a prism configured to receive overlapping polarized light states and diverge the overlapping light states into a first polarized light state and a second polarized light state orthogonal to the first polarized light state;
   an optical lens optically coupled to the prism and configured to direct the first and second polarizing light states to a focal plane, wherein the focal plane further comprises a first half-wave plate and a second half-wave plate corresponding to the first and second polarized light states and wherein the second half-wave plate is configured to change the polarization of the second polarization light state to match the polarization of the first polarization light state thereby forming a matching polarizing light state internal to an instrument, and wherein the first polarizing light state and the matching polarizing light state pass through a slit within the focal plane having two components corresponding to each of the light states; and
   a linear polarizer optically coupled to the focal plane and configured to direct the polarizing light states to a detector.

2. The optical telescope component of claim 1, wherein the prism is a Wollaston prism.

3. The optical telescope component of claim 1, wherein the first and second half-wave plates are true zero-order half-wave plates.

4. The optical telescope component of claim 1, wherein the second half-wave plate is oriented to 45 degrees.

5. The optical telescope component of claim 1, wherein the first half-wave plate is oriented to 0 degrees.

6. The optical telescope component of claim 1, further comprising a rotating half-wave plate.

7. The optical telescope component of claim 1, further comprising a rotating quarter-wave plate.

8. A spectrometer comprising:
   an optical telescope component having
      a prism configured to receive overlapping polarized light states and diverge the overlapping light states into a first polarized light state and a second polarized light state orthogonal to the first polarized light state;
      an optical lens optically coupled to the prism and configured to direct the first and second polarizing light states to a focal plane, wherein the focal plane further comprises a first half-wave plate and a second half-wave plate corresponding to the first and second polarized light states and wherein the second half-wave plate is configured to change the polarization of the second polarization light state to match the polarization of the first polarization light state thereby forming a matching polarizing light state internal to an instrument, and wherein the first polarizing light state and the matching polarizing light state pass through a slit within the focal plane having two components corresponding to each of the light states;

a linear polarizer optically coupled to the focal plane; and a plurality of optical prisms optically coupled to the telescopic instrument and configured to receive internally polarized light from the telescopic instrument and direct it to and from a grating element, wherein the grating element is configured to separate the incoming polarized light into a desired spectrum and redirect the desired spectrum to a detector.

9. The spectrometer of claim 8, wherein the grating element is a silicon grating element.

10. The spectrometer of claim 8, wherein the grating element is manufactured in a first diffraction order.

11. the spectrometer of claim 8, wherein the grating element is manufactured in a diffraction order selected from a group consisting of 1, 2, 3, and 4.

12. The spectrometer of claim 8, wherein the prism is a Wollaston prism.

13. The spectrometer of claim 8, wherein the first and second half-wave plates are true zero-order half-wave plates.

14. The spectrometer of claim 8, wherein the second half-wave plate is oriented to 45 degrees.

15. The spectrometer of claim 8, wherein the first half-wave plate is oriented to 0 degrees.

16. The spectrometer of claim 8, further comprising a rotating half-wave plate.

17. The spectrometer of claim 8, further comprising a rotating quarter-wave plate.

18. The spectrometer of claim 8, wherein the optical prisms are Littrow optics.

19. The spectrometer of claim 8 further comprising a compensator prism optically coupled to the optical prisms and the grating element.

20. A spectral measurement device comprising:

at least a first and a second spectrometer, wherein each of the first and second spectrometers further comprise a telescopic instrument having a prism configured to receive overlapping polarized light states and diverge the overlapping light states into a first polarized light state and a second polarized light state orthogonal to the first polarized light state;

an optical lens optically coupled to the prism and configured to direct the first and second polarizing light states to a focal plane, wherein the focal plane further comprises a first half-wave plate and a second half-wave plate corresponding to the first and second polarized light states and wherein the second half-wave plate is configured to change the polarization of the second polarization light state to match the polarization of the first polarization light state thereby forming a matching polarizing light state internal to an instrument, and wherein the first polarizing light state and the matching polarizing light state pass through a slit within the focal plane having two components corresponding to each of the light states;

a linear polarizer optically coupled to the focal plane; and a plurality of optical prisms optically coupled to the telescopic instrument and configured to receive internally polarized light from the telescopic instrument and direct it to and from a grating element, wherein the grating element is configured to separate the incoming polarized light into a desired spectrum and redirect the desired spectrum to a detector.

* * * * *